United States Patent [19]

Oku et al.

[11] 3,900,745

[45] Aug. 19, 1975

[54] WAVEFORM GENERATOR

[75] Inventors: Takeshi Oku, Kawanishi; Masaru Tanaka, Toyonaka, both of Japan

[73] Assignee: Matsushita Electric Industrial Co., Ltd., Osaka, Japan

[22] Filed: July 23, 1973

[21] Appl. No.: 381,569

[30] Foreign Application Priority Data

July 28, 1972 Japan ............................... 47-76169
July 28, 1972 Japan ............................... 47-76170

[52] U.S. Cl. ................ 307/260; 307/229; 307/264; 328/178; 328/182; 328/213

[51] Int. Cl. .......................... H03k 1/14; H03k 4/00

[58] Field of Search ........... 307/228, 229, 260, 264; 328/61, 142, 143, 156, 182, 187, 213, 178; 235/197

[56] References Cited

UNITED STATES PATENTS 2,768,306 10/1956 Grubb et al. ................ 235/197 UX
2,817,478 12/1957 Newell ................................ 235/197
3,051,912 8/1962 Kaashoek et al. .............. 328/156 X
3,708,659 1/1973 Schirmer et al. ............... 328/142 X

*Primary Examiner*—John Zazworsky
*Attorney, Agent, or Firm*—Stevens, Davis, Miller & Mosher

[57] ABSTRACT

A waveform generator is provided for generating a continuous output waveform by a combination of a plurality of emitter-follower type transistor amplifiers which can be set variably and a multi-tapped potentiometer having the respective taps connected to the outputs of said transistor amplifiers. The above combination eliminates stepwise variations in the output waveform and provides an improved continuous waveform.

Reduction in the output voltage without changing the waveform and a parallel shift of the voltage waveform can also be provided with a simple modification.

1 Claim, 6 Drawing Figures

WAVEFORM GENERATOR

This invention relates to a waveform generator, and more particularly to a waveform generator capable of easily varying the pattern of the output waveform through variable resistors and of providing a continuous output waveform.

Description will be made in conjunction with the accompanying drawings, in which.

Figure 1:
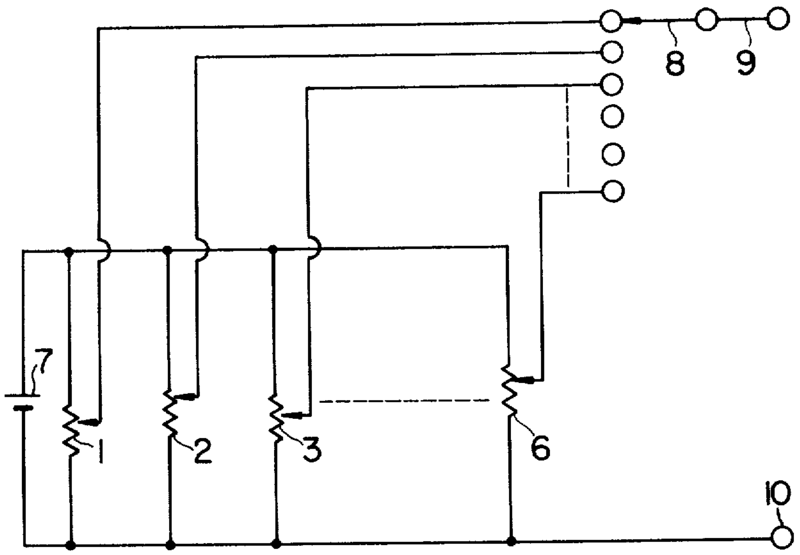
FIG. 1 PRIOR ART
FIG. 1 is a circuit diagram of a conventional waveform generator for generating arbitrary output waveforms.
Figure 2:
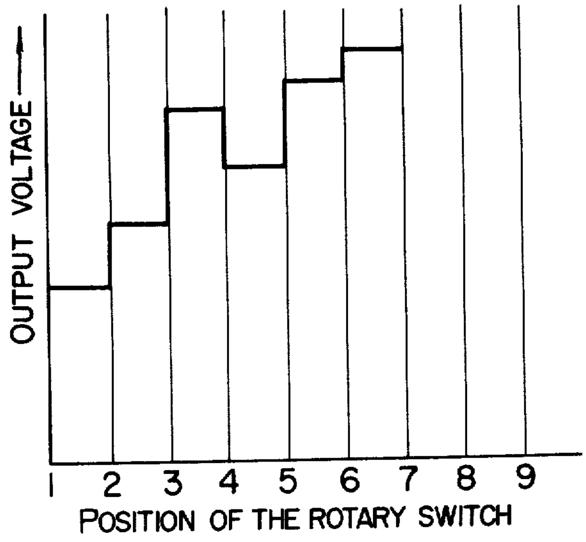
FIG. 2 PRIOR ART
FIG. 2 is an example of the output waveform of the circuit of FIG. 1.

In the conventional waveform generator, as shown in FIG. 1, a multiplicity of potentiometers 1 to 6 is connected, in parallel, to a d.c. voltage source 7 with the sliding terminals of the respective potentiometers connected to the respective fixed taps of a rotary switch 8. A stepwise output voltage waveform as shown in FIG. 2 is provided between taps 9 and 10 by rotating the rotor of the rotary switch 8.

Inherent in such a waveform generator are the following problems:

1. The output waveform is not continuous, but varies stepwise. In the case of controlling some object with this output, excess and deficiency in control arises inevitably as the output is not continuous and smooth control cannot be detailed. A large number of expensive potentiometers are required for improving the precision which makes the waveform generator very expensive.

2. Since a number of potentiometers are connected to a voltage source in parallel, power consumption is large and hence a dc source and potentiometers of high capacity are required.

This invention is intended to eliminate the above drawbacks.

An object of this invention is to provide a waveform generator of low cost capable of easily varying the pattern of the output waveform through variable resistors and of providing a continuous output waveform.

According to an embodiment of this invention, there is provided a waveform generator comprising a plurality of emitter-follower type transistor amplifiers having the bases connected to respective variable bias voltage sources, and a multi-tapped potentiometer having the respective taps connected to the emitter outputs of said amplifiers, thereby providing an output of arbitrary waveform at the variable sliding terminal of said potentiometer.

According to the waveform generator of this invention, the following advantages can be provided.

1. The variable bias voltage sources can be easily formed of variable resistors of low capacity and high resistance; as a result the electric power loss can be reduced and a power source of low capacity can be used. Thus, a reduction in size and cost can be achieved.

2. Since the emitter voltage output terminals of the emitter-follower type transistor amplifiers are connected to the respective taps of a multi-tapped potentiometer, the emitter-follower type amplifiers can be regarded as constant voltage sources by using resistors of low resistance value as resistors in emitter circuits of the emitter follower type amplifiers. Thereby, a stable output voltage can be provided. Further, the output voltage on the sliding terminal of the potentimeter varies almost linearly when the sliding terminal slides from one tap to another. Thus, a smooth control can be achieved.

3. An arbitrary output waveform can be provided which can extend from positive to negative voltages.

4. The output voltages can also be changed all in a constant ratio and further can be shifted in parallel by a certain voltage, keeping a similar waveform.

Figure 3:
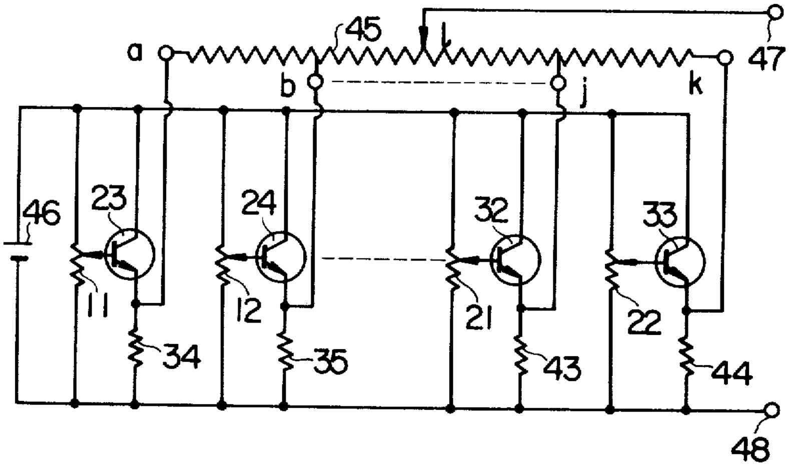
FIG. 3 is a circuit diagram of an embodiment of the waveform generator for generating arbitrary output waveform according to this invention.

A basic embodiment of this invention is shown in FIG. 3. In FIG. 3, variable resistors 11 to 22 are connected to a dc voltage source 46, in parallel, at their both fixed ends. The sliding contacts of the variable resistors 11 to 22 are connected to the respective bases of transistors 23 to 33. The emitters of the transistors 23 to 33 are on one hand connected to one end of the respective resistors 34 to 44 and on the other hand connected to the respective taps of a multi-tapped potentiometer 45. The other ends of said resistors 34 to 44 are connected to the negative terminal of the dc source 46, while the collectors of the transistors 23 to 33 are connected to the positive terminal of the dc source 46. An output voltage is derived between a terminal 47 connected to the sliding terminal *l* of the potentiometer 45 and the terminal 48 connected to the negative terminal of the dc source 46.

Now, the operation of the circuit will be described more in detail. The input (bias)voltage $V_{1B}$ for the transistor 23 is set by the variable resistor 11 to generate an output voltage $V_{1B}$ - 0.7 volt on the emitter of the transistor 23. The resistance 34 is selected to be sufficiently lower than the resistance of the multi-tapped potentiometer between adjacent taps (for example between taps *a* and *b*). Then, the emitter voltage $V_{1B}$ - 0.7 volts can be regarded as a voltage supplied by a constant voltage source. The condition for achieving the above function is that the respective resistances 34 to 44 should be selected at sufficiently low values so that any of the transistors cannot be driven to become non-conductive by currents $i_a, i_b, \ldots, i_k$ flowing from the respective taps *a*, *b*, . . . . ., *k* of the multi-tapped potentiometer to the respective resistors 34, 35, . . . . ., 44 connected to the emitters of the transistors. For this reason also, the base voltage of the respective transistors should be set at least 0.7 volts above the voltage at the terminal 48. When the above conditions are satisfied, since the circuit is of the emitter follower type, the input impedance of the transistor 23 becomes high and hence the variable resistance 11 can be selected to be of high resistance and small current capacity. This is very advantageous in the points of power loss, area occupation factor, and cost.

Figure 4:
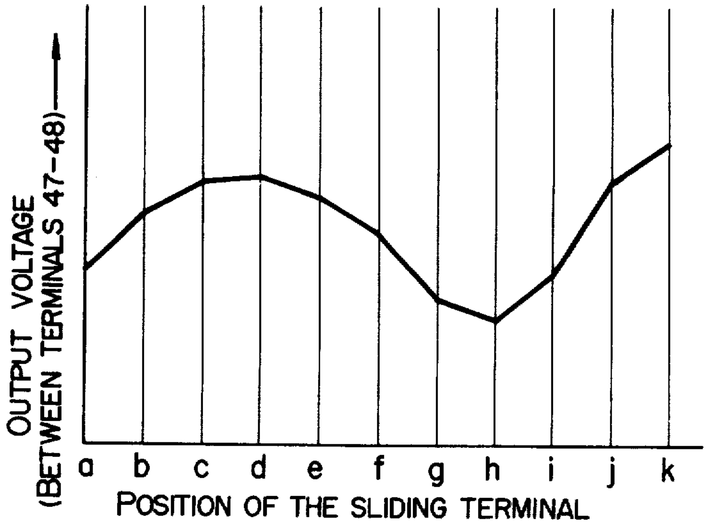
FIG. 4 shows an example of the output waveform of the circuit of FIG. 3.

As in the above structure, when the emitter voltages of the respective transistors which serve as constant voltage sources are connected to the respective taps of the multi-tapped potentiometer, a continuous voltage waveform can be provided between the terminals 47 and 48 according to the movement of the variable sliding terminal of the potentiometer. An example of the continuous voltage waveform is shown in FIG. 4 which is formed by connecting the emitter voltage values of the respective transistors.

Figure 5:
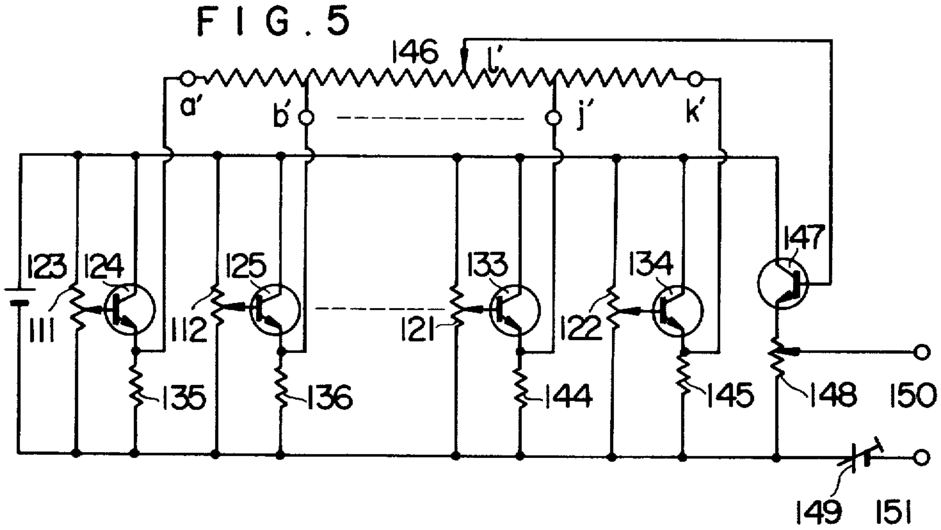
FIG. 5 is a circuit diagram of another embodiment of the waveform generator according to this invention.
Figure 6:
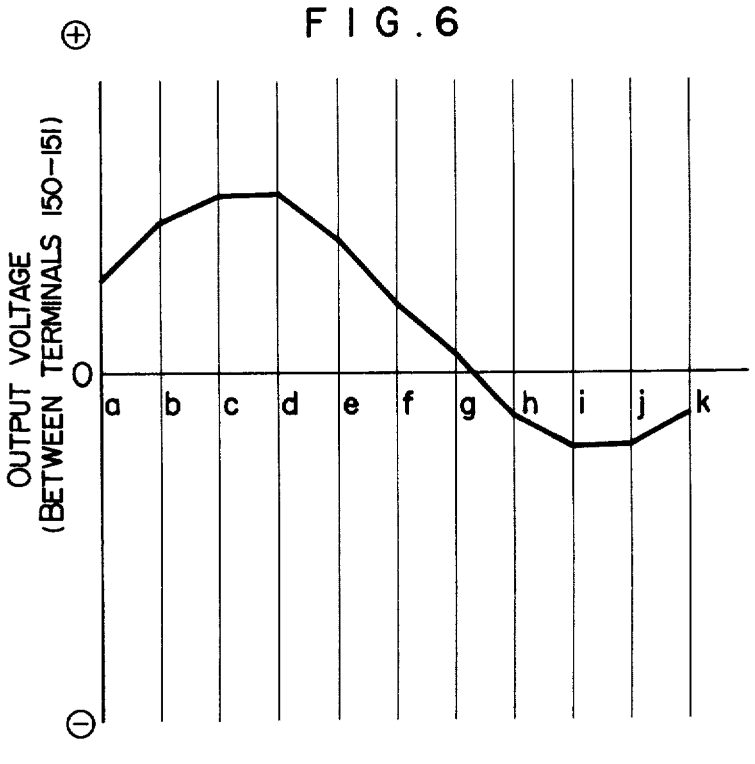
FIG. 6 is an example of the output waveform of the circuit of FIG. 5.

FIG. 5 shows another embodiment of the present invention, which is modified from the circuit of FIG. 3 in the points that the variable sliding terminal *l'* of a multi-tapped potentiometer 146 is connected to the base of another transistor 147 which has the emitter connected to the negative terminal of a dc source 123 through a variable resistor 148 and that another dc voltage source 149 is used for giving a base bias voltage for the output voltage of arbitrary waveform. Here, the output waveform of an arbitrary function is derived between terminals 150 and 151. According to the above structure, a continuous output voltage waveform as shown by the curve in FIG. 6 whose value is the one in the lines connecting the set voltage values of the respective transistors is provided between the terminals 150 and 151 according to the movement of the variable sliding terminal of the multi-tapped potentiometer. Here, the variable dc voltage source 149 is used to set the bias for the output voltage waveform and can easily shift the output voltage to the positive or negative side as a whole. Further, the variable resistor 148 is used to vary the magnitude of the output voltage in a desired ratio.

The above description has been made for the embodiments using NPN type transistors. PNP type transistors can be used similarly. In this case it is necessary to reverse the polarity of the dc source. Further, fixed resistors may be connected to the respective variable resistors so as to prevent the application of a large reverse voltage between the base and the emitter and thereby to prevent breakdown of the transistors.

This invention is mainly intended to adjust the output voltage and current of the control circuit for a welding system, but can be widely applied to control the output voltage and current of various electric systems.

What we claim is:

1. A waveform generator comprising:

a plurality of emitter-follower type transistor amplifiers having their bases connected to respective variable voltage sources;

a multi-tapped potentiometer having a variable sliding terminal displaceable along substantially the entire length of said potentiometer and having a plurality of taps, each of said taps being connected to an emitter output of a respective one of said transistor amplifier, thereby providing an output of arbitrary waveform at the variable sliding terminal of said potentiometer;

another emitter-follower type transistor amplifier having a base connected to the sliding terminal of said multi-tapped potentiometer;

a variable resistor having one end connected to the emitter of said another transistor amplifier as the emitter resistance;

a pair of output terminals connected to the sliding terminal of said variable resistor and the other end of said resistor, respectively; and a variable d.c. voltage source interposed in the connection between one of said output terminals and said variable resistor.

* * * * *